US011294563B1

(12) United States Patent
Epstein et al.

(10) Patent No.: US 11,294,563 B1
(45) Date of Patent: Apr. 5, 2022

(54) PARSING HANDWRITING INTO ONLINE EVENTS

(71) Applicant: Rocket Innovations, Inc., Boston, MA (US)

(72) Inventors: Jacob Epstein, Wakefield, MA (US); Joseph Lemay, Marblehead, MA (US)

(73) Assignee: Rocket Innovations, Inc., Boston, MA (US)

( * ) Notice: Subject to any disclaimer, the term of this patent is extended or adjusted under 35 U.S.C. 154(b) by 0 days.

(21) Appl. No.: 16/258,579

(22) Filed: Jan. 26, 2019

Related U.S. Application Data

(60) Provisional application No. 62/622,477, filed on Jan. 26, 2018.

(51) Int. Cl.
*G06K 9/00* (2006.01)
*G06F 3/04883* (2022.01)
*G06F 40/30* (2020.01)

(52) U.S. Cl.
CPC .......... *G06F 3/04883* (2013.01); *G06F 40/30* (2020.01)

(58) Field of Classification Search
CPC ............... G06F 3/0488; G06F 3/04883; G06F 3/04886; G06F 3/0489; G06F 40/30; G06F 3/03545; G06F 3/03542; G06F 3/0317; G06F 3/0346; G06F 3/041; G06F 40/171; G06F 16/583; G06K 9/00402; G06K 9/00154; G06K 9/222; G06K 2209/01; G06K 9/22; G06K 9/46; G06K 9/34; G06K 9/344; H04N 1/00331
USPC ........................................................ 382/187
See application file for complete search history.

(56) References Cited

U.S. PATENT DOCUMENTS

2017/0083499 A1   3/2017  VanBlon et al.
2017/0351915 A1*  12/2017 Thompson .......... G06F 16/2365
2019/0339861 A1*  11/2019 Lee ........................ G06K 9/222

* cited by examiner

*Primary Examiner* — Huy C Ho
(74) *Attorney, Agent, or Firm* — Nutter McClennen & Fish LLP

(57) ABSTRACT

Illustrative embodiments of the system allow users to write handwritten notes, such as to-do items and calendar events, and have them converted into online objects and actions by a handwriting parser engine. The handwriting is processed and converted into commands that execute online actions or create online objects, which can be local to a device (e.g., creating a calendar entry in a calendar program) or can involve actions using or taken over a communication system (e.g., creating a calendar entry in an online calendar, making a purchase from an online service, transmitting a text or email message, etc.).

20 Claims, 18 Drawing Sheets

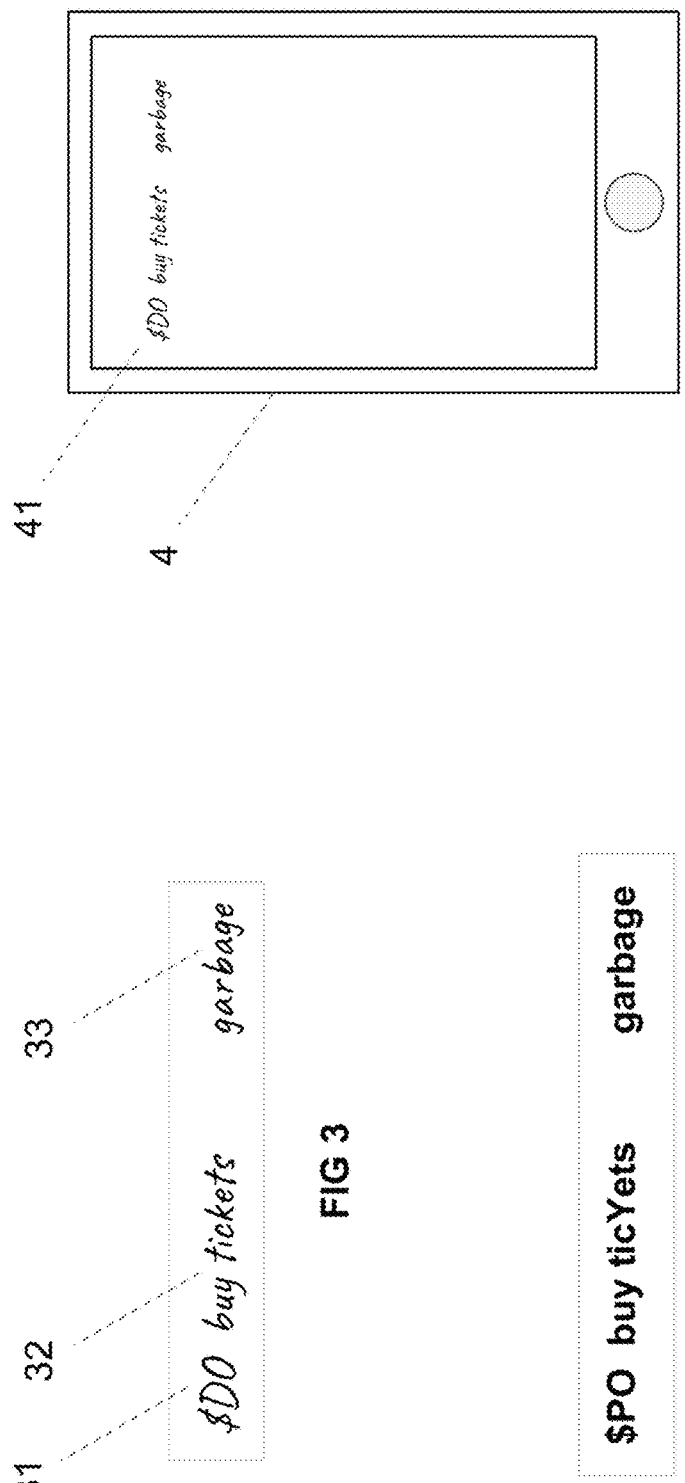

| Valid Keys | Action | Metadata |
|---|---|---|
| $TI | Document Title | <XY, XY, XY, XY> |
| $DA | Date | <XY, XY, XY, XY> |
| $DO | Todo Item | Whitespace threshold: 2X Key<br>#Data Fields: 1<br>Orientation: Right |

Key Lookup Table (406)

Alternate Key Table (404)

| Key Candidate | Confidence |
|---|---|
| 3 / 14 I 2018 | 0 |
| 3 1 14 \| 2018 | 1 |
| 3 / 14 / 2018 | 1 |
| 3 1 14 / 2018 | 2 |

Valid Key Table (405)

| Valid Keys |
|---|
| $TI |
| $DA |
| [0-9][0-9] / [0-9][0-9] / [0-9][0-9][0-9][0-9] |

Key Lookup Table (406)

| Valid Keys | Action | Metadata |
|---|---|---|
| $TI | Document Title | <XY, XY, XY, XY> |
| [0-9][0-9] / [0-9][0-9] / [0-9][0-9][0-9][0-9] | Date | <XY, XY, XY, XY> |

FIG 16

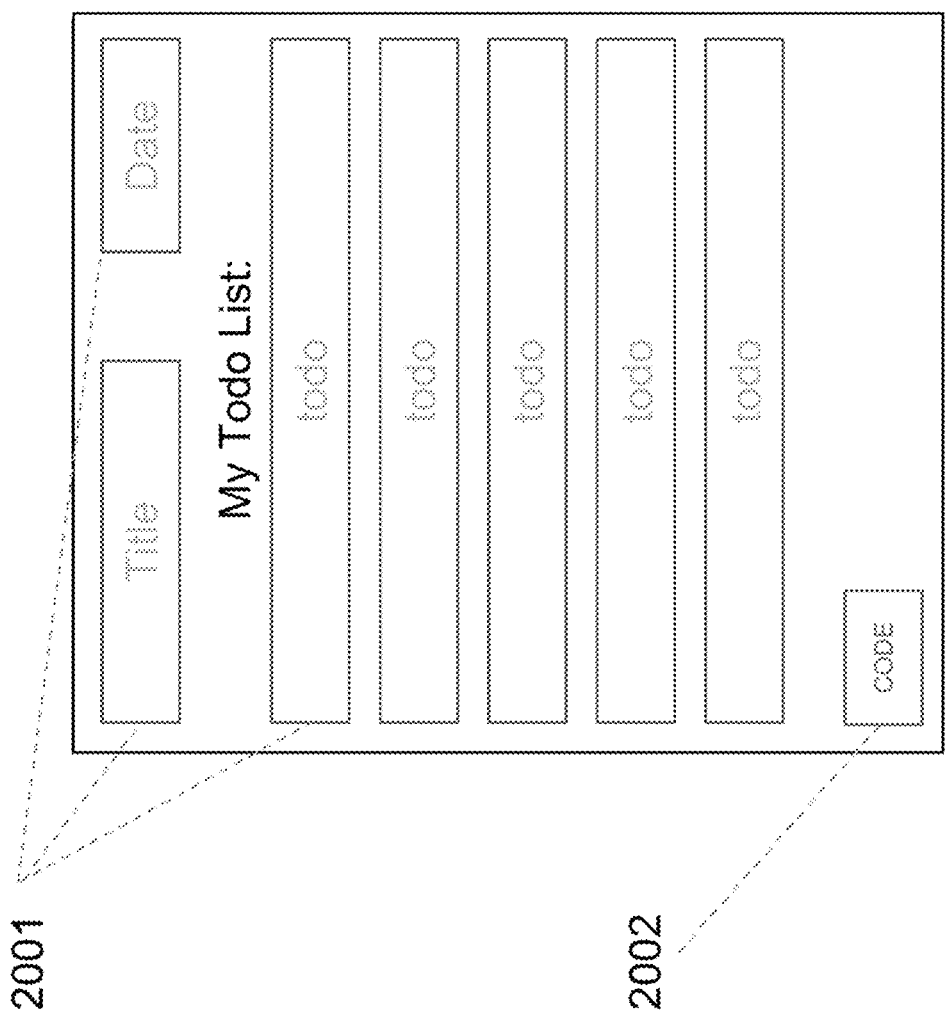

PARSING HANDWRITING INTO ONLINE EVENTS

PRIORITY

This patent application claims the benefit of U.S. provisional patent application No. 62/622,477, filed Jan. 26, 2018, entitled, "Parsing Handwriting Into Online Events," and naming Jacob Epstein as inventor, the disclosure of which is incorporated herein, in its entirety, by reference.

FIELD OF THE INVENTION

This disclosure relates generally to systems designed to trigger action on internet services, and in particular systems which are designed to create online objects within internet services automatically by processing image data from a camera.

BACKGROUND

There are many ways to create objects within online services, such as calendar events or to-do items. In fact, many online services offer APIs to their service to encourage developers to come up with new ways to create objects or perform actions within their service. For example, there are many services that automatically create calendar invites or trigger an email. Another example is the "share" button on mobile devices, which allows users to take a photo and then create an Instagram post or Google Email with just a click.

Meanwhile, especially in business and in education, handwriting with traditional pen and paper remains the preferred method of taking notes, creating to-do lists, and recording important reminders. Users of notebooks will oftentimes take these handwritten notes and create online objects or actions with them. For example, a user may jot down some important to-dos in a meeting and then record them in an online to-do list back at their desk. Or, a student may write down an assignment due date and then enter it into their online calendar that evening.

Creating these online objects from handwritten notes is a chore. Typically, a user must flip through their notebook, find the relevant data, open a web page or app and access the service, and then manually enter in the data from their notes. A user may not have their notebook handy when they go to access these online services or even worse they could lose their notebook before having the chance to enter the data. Also, such manual entry can be time-consuming and error-prone.

SUMMARY

There is therefore a need for a system to allow people to record handwritten notes with pen and paper and then, using a mobile device, scan, parse, and execute relevant notes into online objects and actions.

One advantage to the subject invention is that users can take notes using virtually any writing tool on virtually any surface.

Another advantage to the subject invention is that, by using their mobile device, they can instantly scan their handwritten notes and allow software to parse or "understand" what actions or objects should be created with relevant portions of their notes. Further the notes can be understood even in the absence of 100% perfect character translation.

Another advantage to the subject invention is that, using an internet connection, a mobile device may take these parsed objects or actions and create them instantaneously in a user's preferred online service.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 3 shows an example of handwritten data in accordance with illustrative embodiments of the invention.

FIG. 4 shows a mobile device that has scanned handwritten data in accordance with illustrative embodiments of the invention.

FIG. 5 shows OCR output of processing handwritten data example from FIG. 4.

FIG. 8 shows a Key Lookup Table with some example data related to the example in FIG. 7.

FIG. 15 shows an exemplary Alternate Key Table and Valid Key table from the Wildcard Key example shown in FIG. 14.

FIG. 16 shows an exemplary Key Lookup Table associated with the Wildcard Key example shown in FIG. 15.

FIG. 20 shows an example of Key Regions in accordance with one exemplary embodiment.

DETAILED DESCRIPTION

Illustrative embodiments of the system allow users to write handwritten notes, such as to-do items and calendar events, and have them converted into online objects and actions by a handwriting parser engine, referred to herein as a "Handwriting Parser." Handwriting can be captured for processing by the Handwriting Parser, for example, using a camera (e.g., a camera in a mobile device such as mobile phone or tablet computer) with optical character recognition (OCR) software used to interpret the handwriting, or using a touch screen interface (e.g., on a mobile phone or tablet computer) with handwriting recognition software used to interpret the handwriting. The Handwriting Parser can be implemented on any appropriate device, such as the device on which the handwriting is captured or a device separate from the device on which the handwriting is captured (e.g., a remote server). A camera can be used to capture handwriting from virtually any writing surface using any instrument (e.g., pen or pencil on paper, dry-erase marker on white board, heat-erasable marker on heat-erasable notebook, water-erasable pen on synthetic paper, etc.). The handwriting is processed and converted into commands that execute online actions or create online objects. For purposes of this description, an online action or object can be local to a device (e.g., creating a calendar entry in a calendar program) or can involve actions using or taken over a communication system (e.g., creating a calendar entry in an online calendar, making a purchase from an online service, transmitting a text or email message, etc.). For convenience, some exemplary embodiments are described below with reference to handwriting captured by a camera and processed using OCR.

Figure 1:
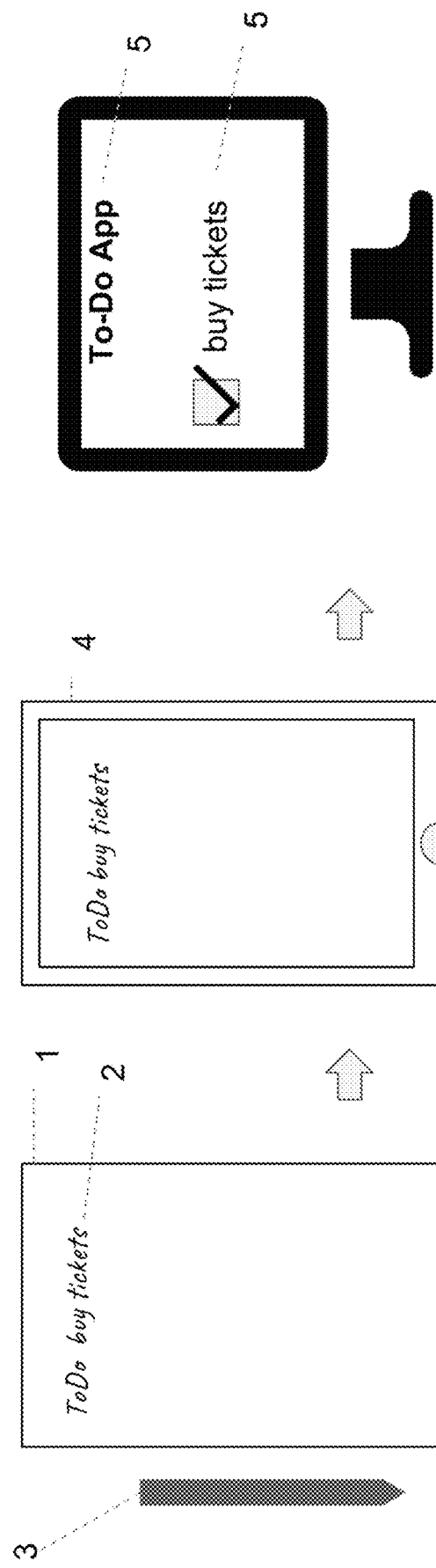
FIG. 1 shows a piece of paper with handwritten notes, a mobile device, and a computer accessing the internet.

The general concept of a Handwriting Parser is demonstrated in FIG. 1. Handwriting Parsing begins when a writing instrument 3 (e.g., pen, pencil, electronic stylus, etc.) is used to write a useful note or reminder 2 (e.g., a to-do item or date) on a writing surface 1 (e.g., paper, whiteboard, electronic tablet, etc.). The Handwriting Parser is designed to process a scanned image of the handwriting (e.g., an image of the handwriting scanned using the camera on an electronic device 4, such as a mobile device) and then to create the equivalent digital representation 5 of that useful note in an appropriate electronic application, such as an online service 6 (e.g., sending a to-do note to a to-do online service such as Asana or Wunderlist).

Although illustrative embodiments refer to creating objects or actions in online services 6, it should also be understood that illustrative embodiments may be used to create tasks in any electronic device. For example, calendar entries may be created on a mobile device containing the handwriting parser. Thus, in this example, no online service is necessarily used, but instead, an electronic application is used. Additionally, while illustrative embodiments refer to online service for discussion purposes, it should be understood that illustrative embodiments may be used with electronic applications, regardless of whether they are connected to the internet.

Figure 2A:
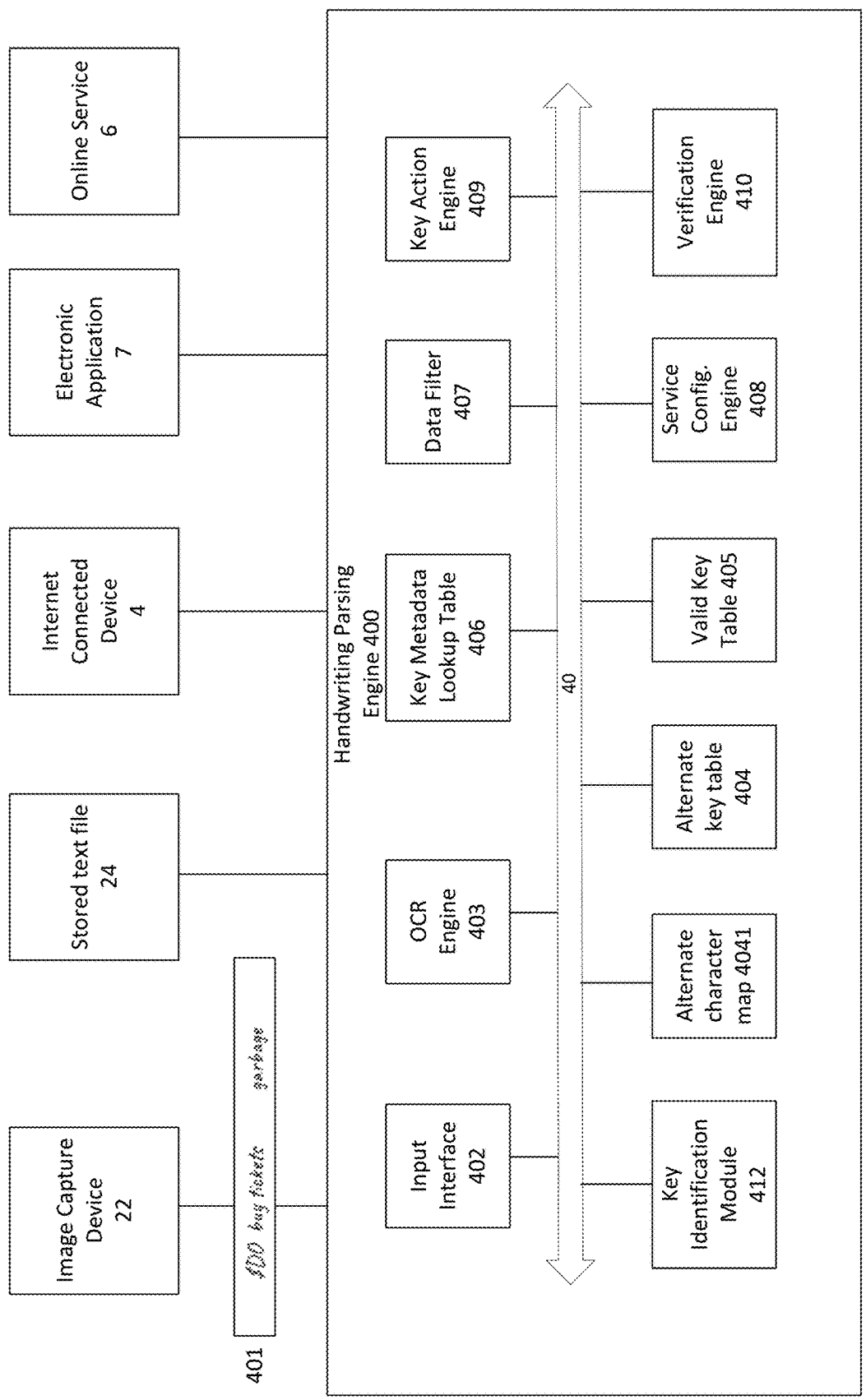
FIG. 2A schematically shows a handwriting parsing engine ("handwriting parser") in accordance with illustrative embodiments of the invention.

FIG. 2A schematically shows a handwriting parsing engine (referred to herein as a "handwriting parser") that parses a text input and performs an action. To that end, the handwriting parser has a general interconnect system 40 that electrically connects a plurality of functional parts that independently and/or with other functional parts control the parameters. Although the interconnect system 40 is shown in the drawing as a bus, those skilled in the art could use any of a wide variety of interconnection systems. Accordingly, discussion of a bus 40 is for simplicity purposes only.

Among the its primary portions, the handwriting parser 400 has an input interface 402 configured to receive an input, such as an image containing handwriting 401 from an image capture device 22 or a stored text file 24. In some embodiments, the input may include, for example, an image of handwriting, data relating to handwriting from an electronic stylus, and/or typed text. An OCR engine 403 performs optical character recognition on the inputted handwriting image or text. In illustrative embodiments, the input includes at least one action key (referred to herein as a "key") that indicates to the handwriting parser 400 that a specified action should be performed. A key identification module 412 identifies various key candidates. As discussed in more detail below, there are many ways of identifying keys.

The key identification module 412 communicates with an alternate character map 4041 that provides a weighted confidence for each of the various key candidates. In some embodiments, the key identification module 412 compares the various candidates with a valid key table 405 and selects the key with the highest overall confidence. The key identification module 412 then looks up the metadata information for the selected key using the key metadata lookup table 406. A data filter 407 uses the metadata to determine one or more valid data field(s) associated with the key.

A service configuration engine 408 allows a user to associate particular key actions with particular electronic applications 7 or online services 6. Thus, after the selected key and valid data field has been identified, the key identification module 412 communicates with a key action engine 409 to execute the action associated with the identified key. Optionally, a verification engine 410 requests verification from the user before performing the action. The verification engine 410 may use verification information as a feedback loop to improve the accuracy of the OCR engine 403.

The handwriting parser 400 also has an interface 402 (i.e., an I/O port, which can include one port or a plurality of ports) to communicate with exterior online services 6 and/or electronic applications 7. In addition, the handwriting parser 400 also may have memory having a database for storing account information for various online services, look-up tables, and prior OCR data, such as a look-up table and/or equation specifying the variability of one or more parameters.

The noted functional parts discussed above in the handwriting parser 400 may be dispersed across multiple machines/devices (e.g., on internet connect device 4, a computer, while others may be other devices not shown in the figures). In fact, the functionality of a single one of the functional parts may be distributed across multiple devices. Accordingly, discussion of a single handwriting parser 400 with all functional parts in that single device is for simplicity purposes only. Those skilled in the art can appropriately provision the system to meet the needs and demands of the specific application.

As discussed below, the functional parts of the handwriting parser 400 may be implemented as software, hardware, firmware, or some combination thereof. For example, the database may be implemented using conventional RAID (redundant array of independent disks) technology in a storage server, while the interface 402 may be implemented as a hardware module having a female portion shaped to receive a corresponding male connector that complies with a specific interconnect standard. As another example, the key action engine 409 may be implemented as a digital signal processor or an application specific integrated circuit programmed to perform the key action function.

Figure 2B:
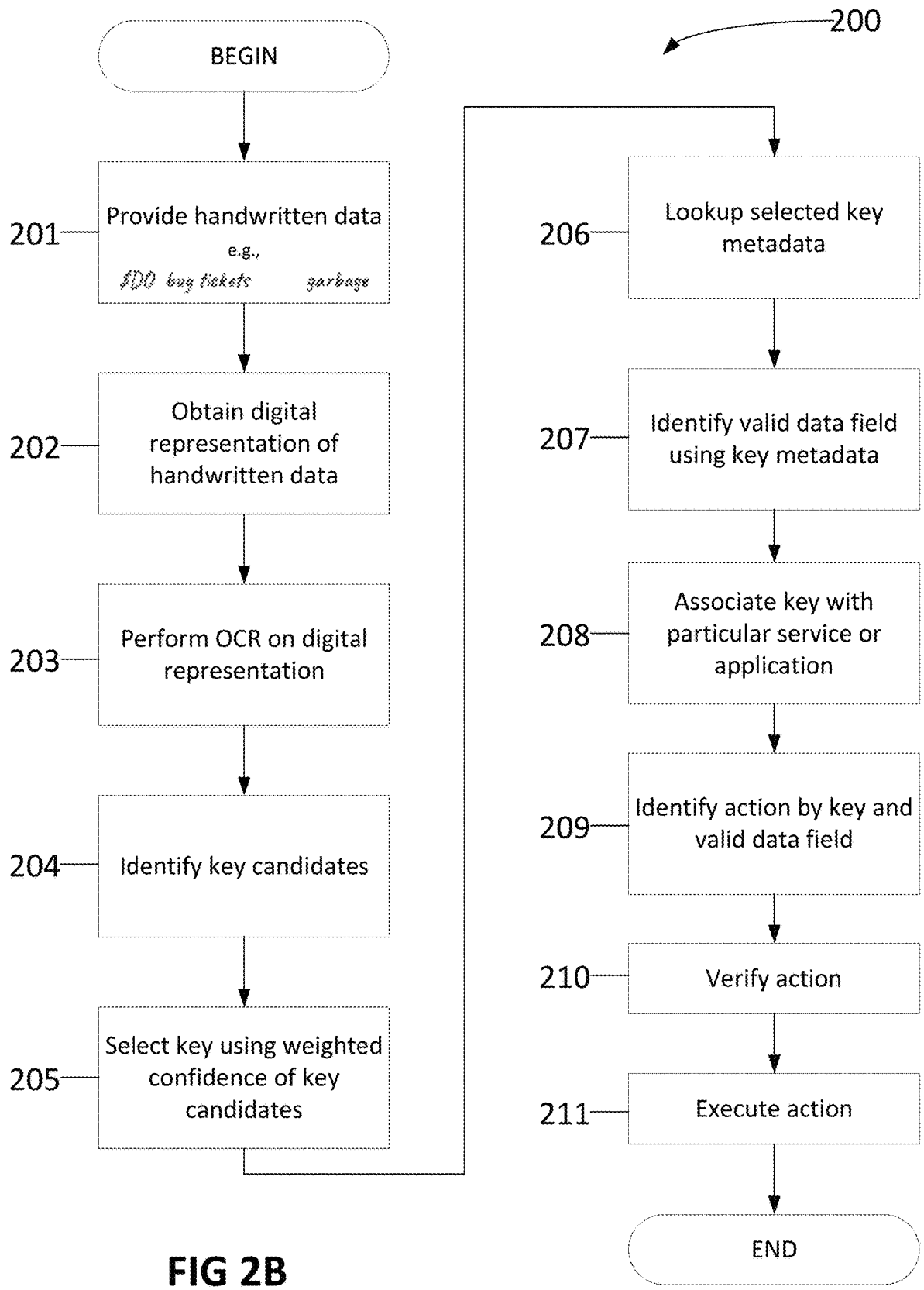
FIG. 2B shows a process of parsing handwriting to identify keys and performing an associated action in accordance with illustrative embodiments of the invention.

FIG. 2B shows a process 200 of parsing handwriting to perform an action in accordance with illustrative embodiments of the invention. It should be noted that this process can be a simplified version of a more complex process of parsing handwriting. As such, the process may have additional steps that are not discussed. In addition, some steps may be optional, performed in a different order, or in parallel with each other. For example, step 208 may take place before any of steps 201-211. Accordingly, discussion of this process is illustrative and not intended to limit various embodiments of the invention. Finally, although this process is discussed with regard to parsing a single line of handwriting, the process of FIG. 2B can be expanded to cover a plurality of lines, paragraphs, or blocks of text at the same time. A detailed look at each block follows. It should be noted this symbolic representation is one view of the logical flow of the Handwriting Parser 400. Logical flow variants would not change the underlying enablement of the system using the algorithmic methods outlined below.

The process begins at step 201, which provides handwritten data 401. This handwritten data 401 may be written by a user using, for example, traditional pen and paper or a stylus and a tablet. The handwritten data 401 may also be written using thermochromic ink on synthetic paper, such as is disclosed in U.S. patent application Ser. No. 15/811,360, which is incorporated herein by reference in its entirety.

FIG. 3 schematically shows handwritten data 401. As can be seen in this example, a user has written the to-do item of "buy tickets" 32. They have noted this using a "Key" 31 of "$DO," which will inform the Handwriting Parser that this item is a to-do item. Keys are a sequence of handwritten characters that inform the Handwriting Parser to execute a command. One can imagine different keys to denote different types of information, such as, for example, dates, titles, reminders, etc. Further, on the right side of the page, the user has written the word "garbage" 33, referred to as invalid text 33, which is not intended to be associated with the to-do item.

It should be understood that although "$DO" is shown as the key 31 for creating a to-do list, illustrative embodiments may use a variety of keys 31. Furthermore, the key 31 for creating a to-do list does not have to be $DO. In various embodiments, users can customize keys 31 for various actions (e.g., "@TD" for to-do list). Additionally, some embodiments do not require the use of a symbol (e.g., $) to identify the key, although some embodiments may require such a symbol. The key may be identified by any predetermined set of one or more characters (e.g., combinations of numbers, letters, and/or symbols). However, some embodiments may use a character symbol to help with ease of identification of the key.

FIG. 4 schematically shows the next step in the process of 200, which obtains a digital representation of the handwritten data 202. The data 401 may be provided to the handwriting parser 400 via the input interface 402. For example, a mobile device 4 or other computing device that couples to a camera may scan or photograph the real world Handwritten Data 401 to create the digital representation. There are many methods of scanning or photographing and many forms of acceptable digital file output (e.g. JPG, PNG, BMP, etc.). The output of this process is a digital representation of the Handwritten Data 41. Generally speaking, some embodiments of the Handwriting Parser can be used with known or future-developed scanning or photographing methods and digital file outputs.

In some embodiments, the image may be captured as part of another process, for example, during the page scanning described in U.S. patent application Ser. No. 15/211,462, which is incorporated herein by reference in its entirety. Indeed, in some embodiments, the handwritten data 401 may be provided on a notebook having, among other things, a folio identifier representation, destination symbols, and a page border identification feature as described in application Ser. No. 15/211,462. Furthermore, in some embodiments, capturing an image having a destination marking and handwritten data key 31, may simultaneously cause performance of the processes described in application Ser. No. 15/211,462 and herein.

FIG. 5 schematically shows the next step 203 of the process, which performs optical character recognition, or "OCR", on the digital representation 42. using an OCR Engine 403. There are many software programs (or "OCR Engines") that convert handwritten text to digital text (i.e. OCR or Optical Character Recognition). Generally speaking, embodiments of the Handwriting Parser 400 can be used with known or future-developed OCR Engines 403. These OCR engines 403 take image files (or sometimes stylus stroke data) as input and output all of the characters that are detectable in the source file. Often, the output of the OCR Engine 403 is an imperfect representation of the handwritten characters. That is, no OCR engine 403 is known to the inventors to always be 100% accurate. For example, OCR engines can have difficulty, depending on the handwriting, to detect the difference between a '0' (a zero) and an 'O' (the letter "O") or even a 'D' and a 'P'. It can be seen in the example shown in FIG. 5 that the OCR Engine 403 has not accurately translated the Handwritten Data 401 shown as an example in FIG. 3. The OCR Engine 403 has translated a 'D' to a 'P' and a 'k' to a 'Y', producing a digital character string of "$PO buy ticYets garbage" instead of "$DO buy tickets garbage".

Figure 6:
FIG. 6 shows an Alternate Character Map and Alternate Key Table from the example in FIG. 5.

In some embodiments, the process proceeds to step 204, which uses an alternate key table 404 to identify key candidates. FIG. 6 schematically shows the Handwriting Parser utilizing the Alternate Key Table 404 based on an Alternate Character Map 4041. The Alternate Character Map 4041 stores weighted alternatives of transcribed characters, where, in this exemplary embodiment, 1 is a very likely alternative and higher numbers (e.g., 2, 3, 6) are less likely alternatives. In the example shown in FIG. 6, we see from the Alternate Character Map 4041 that a 'P' is very commonly mistaken by the OCR Engine as a 'D', which is why its weight (shown in parentheses) is a 1. Additionally, the Alternate Character Map 4041 shows that the 'O' is less likely to be, but sometimes is, mistaken as a which is why the weight of this alternate character 'Q' is a 5. It should be understood that the Alternate Character Map 4041 is merely exemplary, and not intended to limit various embodiments of the invention. Furthermore, illustrative embodiments may use artificial intelligence (e.g., neural networks) to enhance the accuracy of the Alternate Character Map 4041 and/or the Alternate Key Table 404. Furthermore, some embodiments may skip this step entirely or conditionally (e.g., for a high confidence that OCR'd keys are correct).

Using the weights of the alternate characters in the Alternate Character Map 4041, an Alternate Key Table 404 can be generated (e.g., by the Handwriting Parser 400 or separately from the Handwriting Parser 400), where the Alternate Key Table 404 is made up of various permutations of Alternate Characters (e.g., in some embodiments all of the various permutations), with each of their weights added together (starting from zero) to create a Confidence metric where a higher number represents a lower confidence. For example, the Alternate Key Table 404 shown in FIG. 6 shows the first several entries of the table sorted by confidence. The original output of the OCR Engine '$PO' is our highest confidence key. Because a 'D' in place of the 'P' only adds 1 to the confidence metric, '$DO' is next on the list. The string 'SDO' has a confidence weight of 3 because it has two alternate characters contained in it: 'S'(2)+'D'(1)=3. Only the first 5 rows of an exemplary Alternate Key Table 404 are shown in FIG. 6. It should be understood by a person of skill in the art that many other permutations that are not shown may be included, and that the Alternate Key Table 404 can grow quite large depending on how many characters are contained in the Alternate Key Map 4041. Some embodiments include an alternate key generator (not shown) as a separate component, while in some other embodiments the alternate keys may be generated by the key identification module 412.

Figure 7:
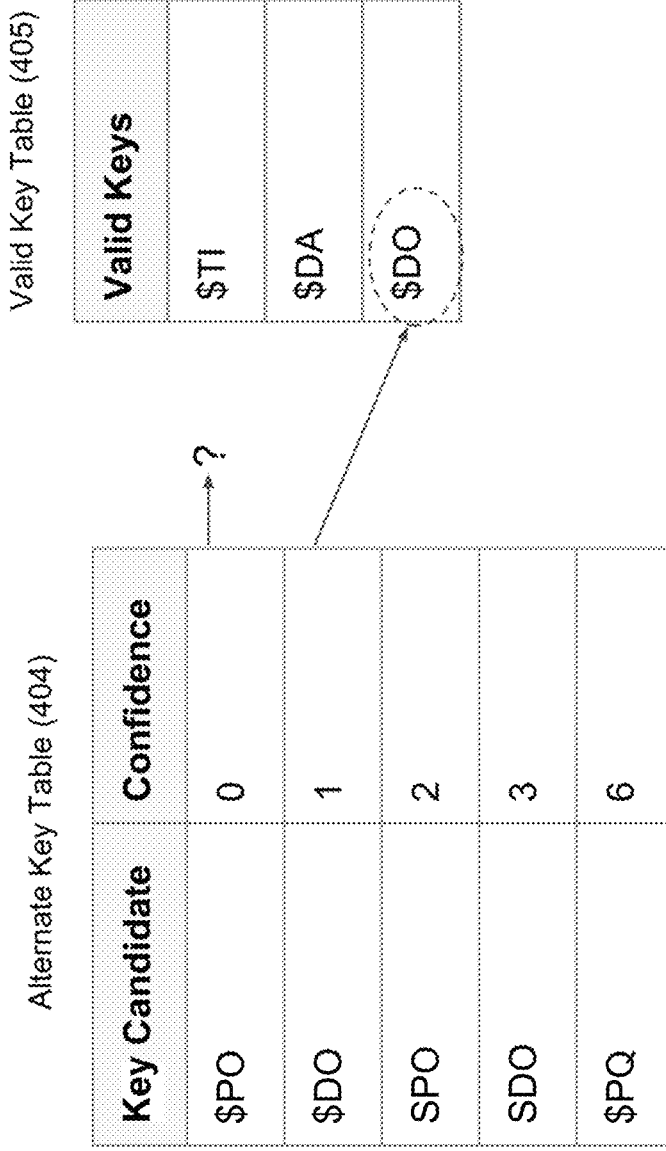
FIG. 7 shows an Alternate Key Table being matched to a Valid Key Table from example in FIG. 6.

The process then proceeds to step 205, which selects the key using the weighted confidence of the key candidates. Specifically, the Handwriting Parser 400 compares the Alternate Key Table 404 entries to valid Keys in the Valid Key Table 405. The Handwriting Parser may start, for example, with the lowest confidence weight (i.e., highest confidence) key candidate (e.g., "$PO" in this example) and then go to the next key candidate based on confidence weight. It can be seen in FIG. 7 that there are three valid keys inside the Valid Key Table 405. The Handwriting Parser first tries to match '$PO', but there are no valid matches inside the Valid Key Table 405. The Handwriting Parser then tries $DO, the next highest confidence key, and this is a hit inside the Valid Key Table 405. The process then proceeds to step 206, where '$DO' is passed on to the Key Lookup table 406.

Here, a Key Lookup Table 406, schematically shown in FIG. 8, contains metadata and instructions for each Valid Key 31. After the Handwriting Parser identifies a valid key 31 within the handwritten data 401, associated metadata provides instructions regarding the appropriate action. In this example, the Key '$DO' indicates that the associated Action 801 is a "to-do item" and the metadata can indicate, amongst other things, that the to-do data should be positioned to the right of the Key on the page and how much whitespace is acceptable between the Key and the to-do data before the data is deemed to be non-relevant to the Key. The next step 207 in the process uses the Data Filter 407 to filter and identify the valid data that is to receive the action based on the key.

Figure 9:
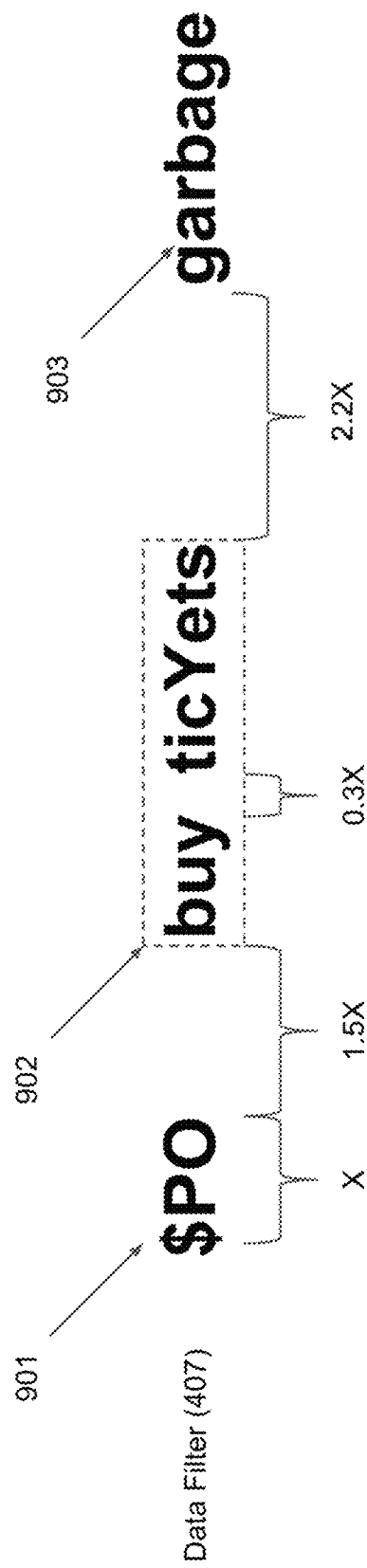
FIG. 9 shows a Data Filter with example data from FIG. 5.

As depicted in the example of FIG. 9, the Data Filter 407 returns to the OCR Engine 403 output to apply a data filter to look for the valid data to populate the to-do item prefixed by the Key '$DO'. The Metadata inside the Key Lookup Table (see FIG. 8) can indicate, for example, that the Valid Data to populate the to-do item should reside to the right of the valid Key. In many cases there is no intrinsic scale in a digital image, so measurements of acceptable bounds may be made relative to the content. In this case, the Handwriting Parser 400 identifies that the Key is X pixels wide and contains 3 handwritten characters. The Handwriting Parser 400 can then make judgments as to what amount of whitespace is acceptable after the key before reaching a threshold beyond which is considered unrelated data to the Key. In this case, the Metadata contained in the Key Lookup Table has indicated that there is only a single data field 902 which contains the to-do item. This data field is defined by the amount of whitespace between the characters in the OCR Engine 403 output.

In one exemplary alternative embodiment, rather than the Data Filter 407 returning to the OCR Engine 403 output to apply a data filter to look for the valid data to populate the to-do item prefixed by the Key '$DO', the OCR Engine 403 can be configured to process an entire line or page of text and store the OCR'd output along with metadata allowing the Data Filter 407 to identify the valid data to populate the to-do item. For example, with reference again to the example of FIG. 5, the OCR Engine may generate and store an output file including "$PO" with metadata indicating where "$PO" is located on the page (e.g., distance from left and top margins), "buy" with metadata indicating its position relative to "$PO," "ticYets" with metadata indicating its position relative to "buy," and "garbage" with metadata indicating its position relative to "ticYets." The relative positions provided by the metadata then can be used to identify the valid data.

In the example shown in FIG. 9, the Key is X pixels wide and there are 1.5X pixels between the Key and the first character 'b'. This 1.5X falls below the threshold of 2X as indicated in the Metadata (shown in FIG. 8). Accordingly, the entire word 'buy' will be contained in the Valid Data field. The next bit of whitespace is only 0.3X between the word 'buy' and 'ticYets'. This means the entire string 'buy ticYets' will be contained in the Valid Data field. The next bit of whitespace is 2.2X between 'ticYets' and 'garbage'. This distance of 2.2X is more than the threshold of 2X contained in the Metadata, which means we have found the end of the Valid Data field 902. The Excess whitespace and the string(s) "garbage" beyond the threshold 903 will be discarded as non-valid data. In some embodiments, the data to the right of the Key that does not contain whitespace beyond the Threshold is considered the valid data and is used in step 209, where the valid data is passed on to the Action Lookup 409. It should be understood that the Metadata described for this example is merely intended to facilitate discussion and not limit various embodiments of the invention. Accordingly, those of skill in the art and/or artificial intelligence can develop far more complex Metadata rules for determining the valid data.

It can be seen that in some embodiments, the Handwriting Parser may be aware of absolute measurements, such as an application where a piece of paper of a known size is being scanned. For example, application Ser. No. 15/211,462, which is incorporated herein by reference, has a folio identifier representation that may provide this information to the Handwriting Parser. Additionally, or alternatively, this information may be entered manually (e.g., user selected 8.5"×11" paper). Accordingly, in some embodiments, the whitespace and character measurements may be made in standard measurement units (e.g. millimeters), alternatively, or in addition to, relative measurements (e.g. pixels).

Figure 10:
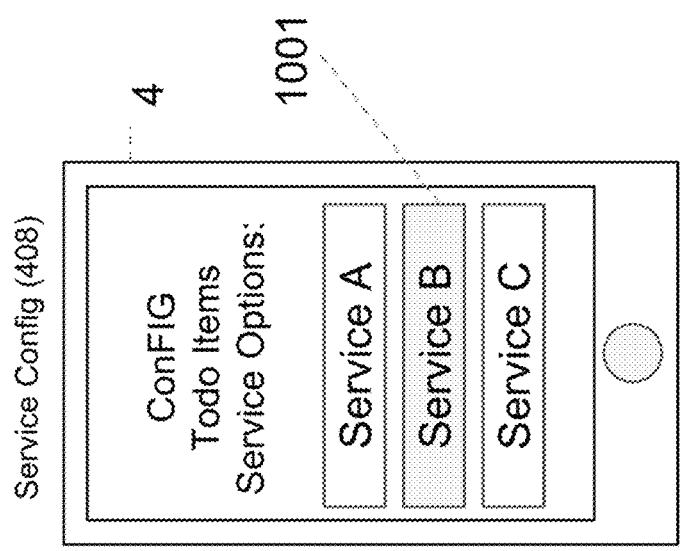
FIG. 10 is a mobile device showing an example symbolic Service Configuration.

In some embodiments, the Action Lookup step 209 can be preceded by a Service Configuration step 208. The Service Configuration step 408 allows a user to configure an appropriate online service 1001 using the service configuration engine 408 to associate with a particular Key. For example, a user may want to associate to-do item Keys with an online to-do service (e.g., Asana, Wunderlist, Trello), or associate a calendar item with an online calendar system (e.g., iCal, Google Calendar, etc.). In the example shown in FIG. 10, the user is using a mobile device 4 to configure the Handwriting Parser to associate Service B with to-do Keys.

Figure 11:
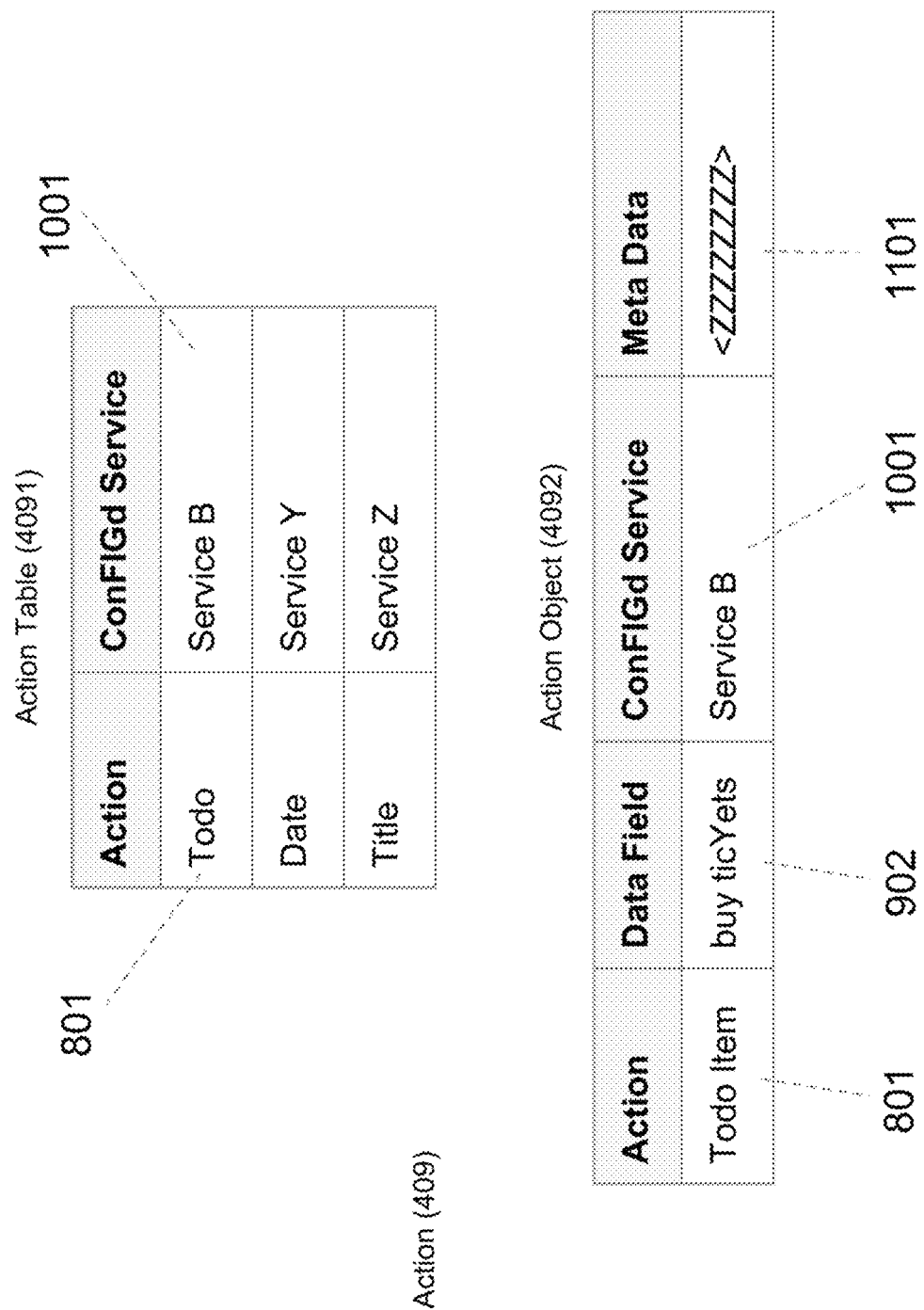
FIG. 11 shows both an Action Table and Action Object as part of the Action block using example data from FIG. 9.

The process then proceeds to step 209, which identifies the intended action by key and valid data field. In some embodiments, the output from Service Configuration step 208 is stored in an Action Table 4091 and used by the key action engine 409 during step 209, which identifies the action by key and valid data field, along with the configured service 1001 and associated metadata 1101, as shown schematically in FIG. 11. It can be seen in this example that the user has associated the Action 801 (To-do) with a Service 1001 (e.g., Service B). At this point in the process, the Key has already been mapped to an Action in the Key Lookup Table 406, and the Data Filter 407 has already extracted the valid data field 902, so the key action engine 409 can assemble an Action Object 4092 that contains the Action 801, the Data Field 902, the Configured Service 1001, and any metadata 1101 required to execute this action (e.g. API, authentication, etc.).

Figure 12:
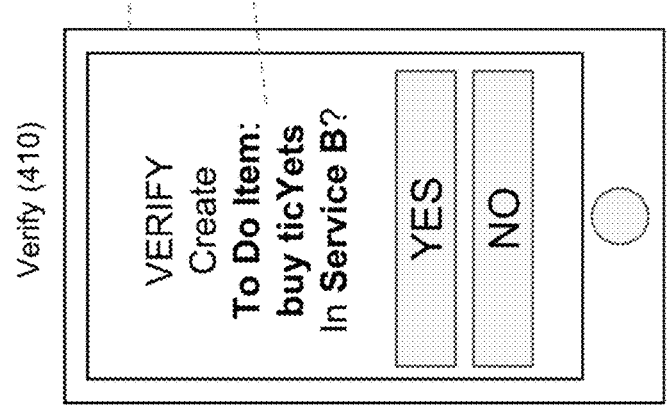
FIG. 12 shows a mobile device verifying the action shown as an example in FIG. 11.

FIG. 12 schematically shows an optional verification step 210 that may be performed prior to execution of the action. The verification engine 410 prompts 21 the user (e.g., on the scanning device 4 or other device on which the Handwriting Parser is run) to verify the Action 801 before Execution. This would be an opportunity for the user to verify that the Action 801 and Data 902 and Service 1001 is correct as well as make corrections to the Action or Data, if necessary. Corrective action taken may be used by a neural network, for example, to enhance the accuracy of OCR.

Figure 13:
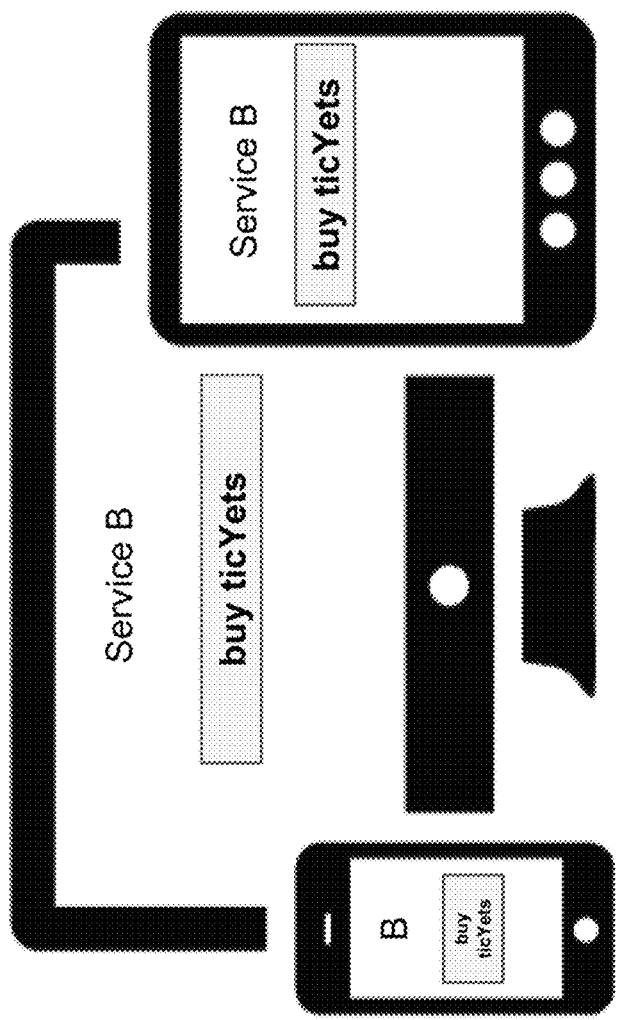
FIG. 13 shows a handwritten command executed as part of the Execute block on an internet service in accordance with one exemplary embodiment.

In step 211, the Handwriting Parser executes the command in the Execute block 411 as shown in FIG. 13. Here the Handwriting Parser uses a web service, API or other inter-application communication system to use the data from the Action Object 4092 to create the appropriate internet event or object. In the example shown in FIG. 13, a to-do item of "buy ticYets" has been created in the internet Service B, which, in this case, is available across devices for the user to interact with and check off online when complete.

It can be seen that the final created object is imperfect. The original handwriting was "buy tickets," not "buy ticYets". However, given there is an almost infinite number of valid data strings a user may have wished to create as a to-do item, it can be difficult for the Handwriting Parser to correct every mistake by the OCR Engine. However, since the Key possibilities are very few in number, the Handwriting Parser is able to more loosely match the output from the OCR engine to the set of valid Keys and successfully determine that $PO was actually meant as $DO. However, as described previously, in some embodiments the system may factor commonly used phrases and/or words into the weighting algorithm, and help increase accuracy of the OCR engine.

It can also be seen that Valid Key selection is extremely important. For example, selecting a valid key of "And" would not make sense, as this is an extremely common word and the Handwriting Parser would constantly be processing "false positive" keys. Further, the Handwriting Parser can be made more robust with Keys that are very different from one another, optimally with zero overlap in Key Candidate Tables.

In some embodiments, Keys can also contain "wildcards" or logical elements that can be any set of pre-defined characters, e.g., similar to regular expressions commonly used in software coding or scripting. These Wildcard Keys work very much in the same way as fixed Keys described above.

Figure 14:
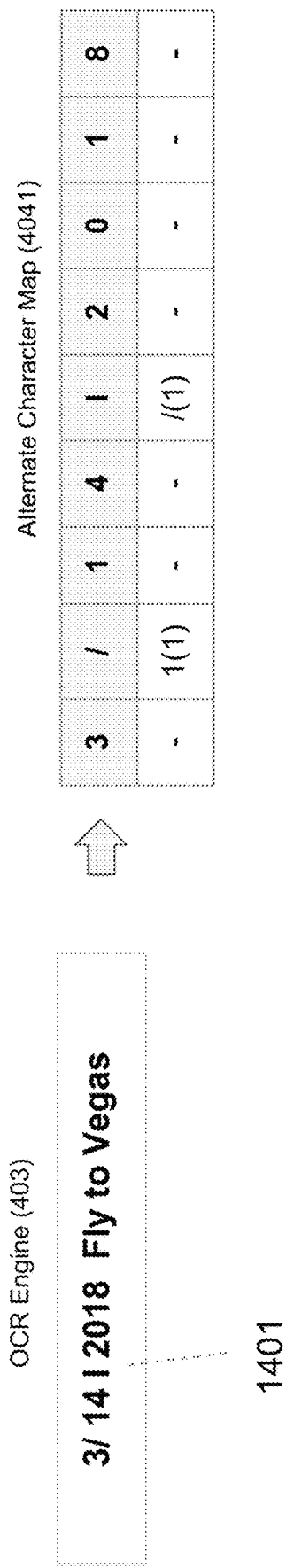
FIG. 14 shows an example of OCR output of a Key which will be subject to a Wildcard Key match and the associated Alternative Character Map in accordance with one exemplary embodiment.

An example of a Wildcard Key 1401 is shown in FIG. 14. The user can write a date in the following format: "3/14/2018" (i.e. Mar. 14, 2018). The OCR Engine output may misinterpret a '/' as another character, such as an 'I' so that the OCR Engine output is "3/14 I 2018" as shown in FIG. 14. Per the normal logical flow, the Key candidate is fed in to an Alternative Character Map 4041. In this case there are only two characters that are commonly misinterpreted, both with a weight of '1'.

Accordingly, using the Alternate Character Map 4041, the Alternate Key Table 404 is built, shown in FIG. 15. In this case, there are two Key Candidates with Confidence weights of '1'. They will both be compared to the Valid Key Table shown in FIG. 15. In this Valid Key Table, we can see there are two fixed Keys, "$TI" and "$DA", and one wildcard Key "[0-9][0-9]/[0-9][0-9]/[0-9][0-9][0-9][0-9]". The wildcard Key can be formed similarly to a regular expression so that many different strings fit the one pattern. In this case, the wildcard Key is looking for any 1-2 numeric characters, followed by a '/', followed by any 1-2 numeric characters, followed by a '/' followed by 1-4 numeric characters. This pattern is a common date format which would fit both the strings "1/10/2018" as well as "12/3/99".

Figure 17:
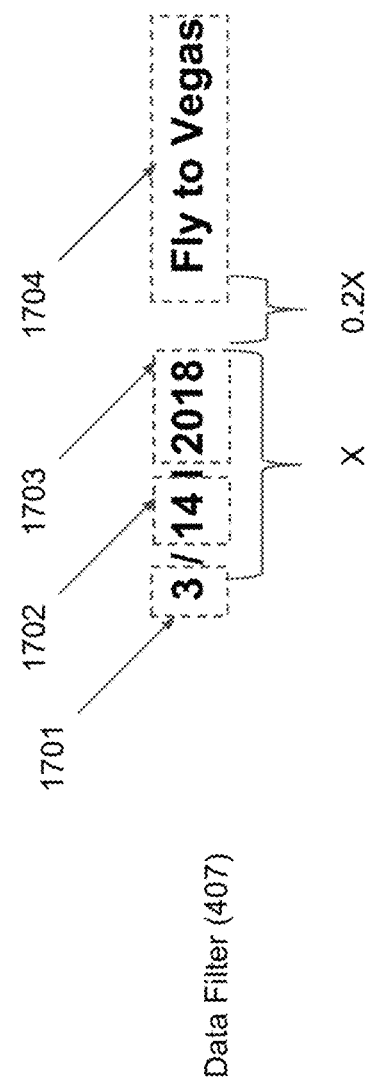
FIG. 17 shows an exemplary Data Filter associated with the Wildcard Key example in FIG. 14.

It can be seen in FIG. 15 that the first hit in the Alternate Key Table 404 that is a valid key is "3/14/2018". Then, looking at the Key Lookup Table in FIG. 16, we see that this has a Date Action associated with this Key. FIG. 17 shows the Data Filter 407 execution on this Handwritten Data. According to the Metadata from the Key Lookup Table, this Key has four Valid Data Fields: Month 1701, Day 1702, Year 1703 and the Event Data 1704. Notably, some of the data is within the Key itself in this case. Though the rest of the flow for this example is not shown, one can see this data can be used to build an Action Object for an online or electronic calendar using the dates derived from the data filter and populating an event of "Fly to Vegas".

Keys also can be defined to have optional fields that can allow for additional or alternate actions to be taken. Using the example in FIG. 2B ("$DO buy tickets garbage"), the Key can be defined to allow for a number of variations, such as, for example:
$DO buy tickets by [date]
$DO buy tickets on [date]
$DO buy tickets after [date]

In the example that begins in FIG. 2B ("$DO buy tickets garbage"), the Key was already set up to be assumed as the "DO" on the far left of the string. Generally, the Handwriting Parser processes the entire document of text looking for Key candidates in order to complete the process 200 of FIG. 2B. Key candidates may be any string with some configurable minimum value of whitespace surrounding it, e.g., with the configurable value of whitespace being a value that represents the minimum space between words on the page. It can be seen in FIG. 18 that there some minimum value of whitespace 2001 between words 2002 on this page. After the document is broken into words, the Handwriting Parser may treat each word as a potential Key Candidate. In this example, most words do not match a Valid Key, thereby disqualifying them from continuing along the algorithm block diagram. Some embodiments may put restrictions on Keys, such as, for example, number of characters, type of characters (e.g., all capital letters), identifying characteristics (e.g., all keys must start with a designated marker such as "$"), or restricting them to only certain parts of the page (e.g., left aligned). In some embodiments, users may customize the restrictions. Additionally, illustrative embodiments may provide instructions with details of default key restrictions.

Figure 18:
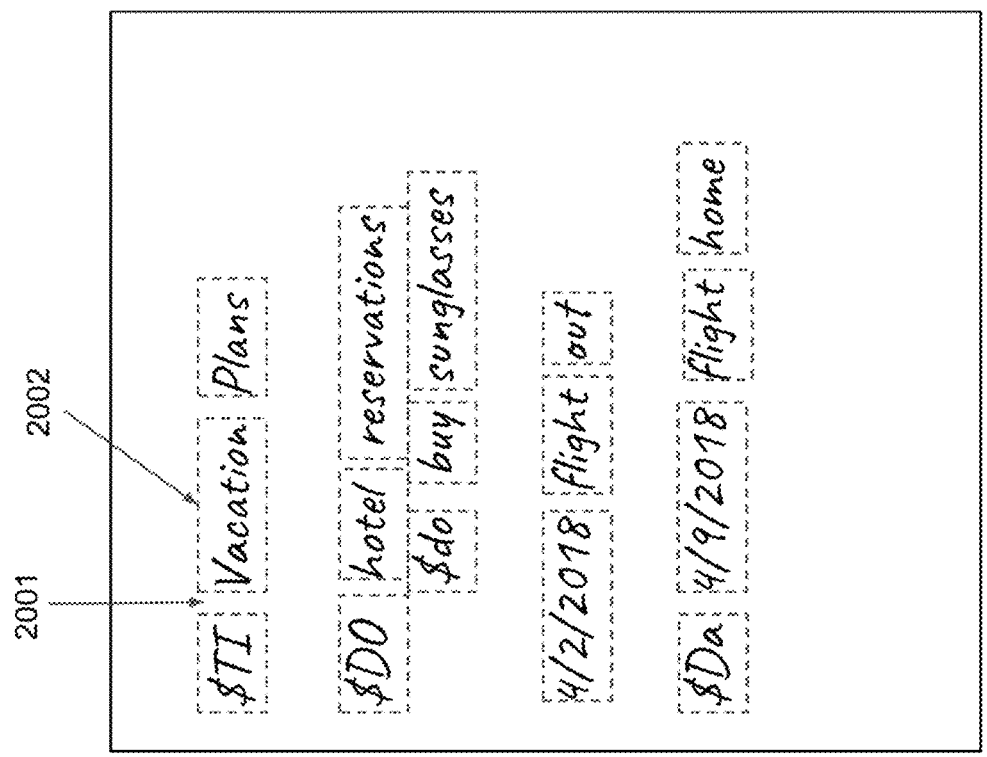
FIG. 18 shows a piece of paper with many handwritten commands on it.
Figure 19:
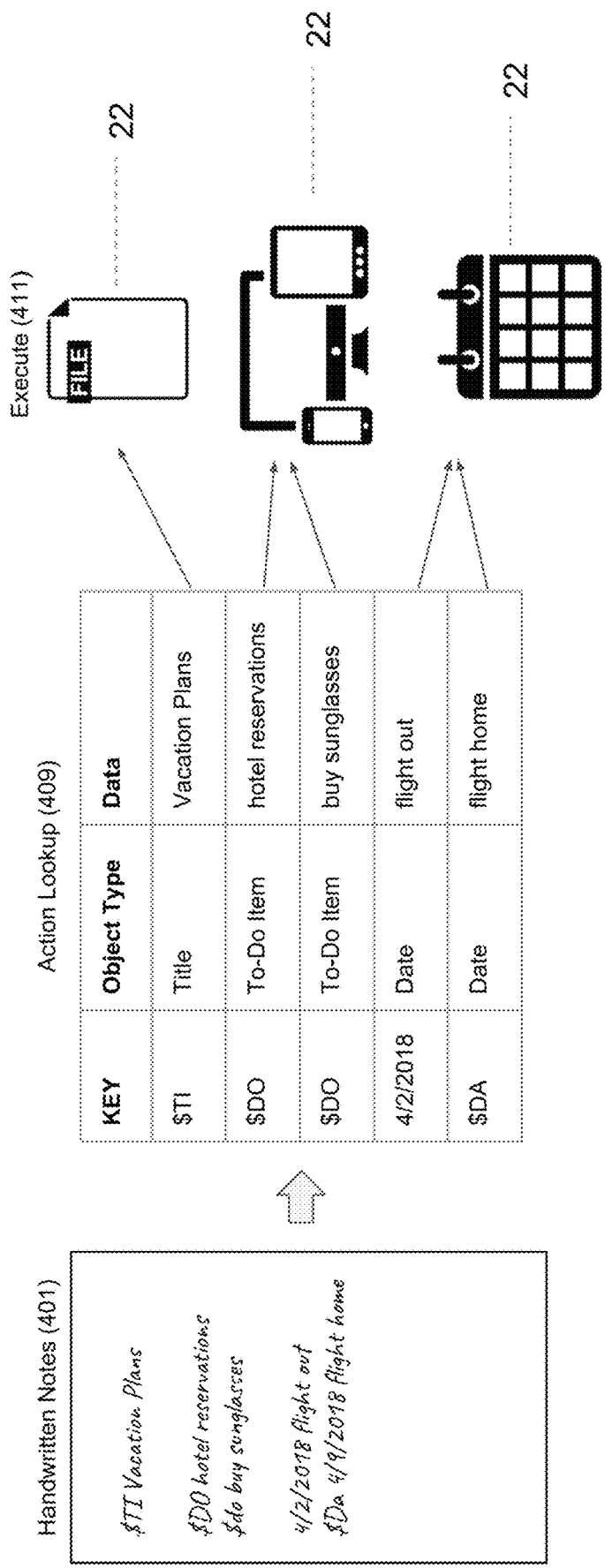
FIG. 19 shows the handwritten command example of FIG. 18 as well as the associated Action Lookup and Execute block of the same example.

For illustration purposes, the example shown in FIG. 18 is expanded on in FIG. 19 to show five different Keys and how they may end up in the Action Lookup Table and Execute block. The example shows a Key of "$TI" sending the entire document, either transcribed or as an image, to a file on a cloud service. Two to-do items were found using two different cases of "$DO" and "$do". And two different dated events were found using very different Keys, where one is a Wildcard Key that contains the date and the other a Fixed Key which has the date as a separate data field. Additionally, although the "4/9/2018" date may have otherwise been identified as a Wildcard Key, the Handwriting Parser identifies that the date is a valid data entry for the "$Da" key, rather than as a separate key.

Rather than strings, Keys may also be locations on the page or Key Regions. That is, designated locations on a pre-defined writing surface may act as the Key. Key Regions 2001 are designated areas on a pre-defined page. An example of this is shown in FIG. 20 where there is a title block, a date block, and a bunch of lines for to-do items. When a user writes inside of these pre-defined areas on the page, it communicates to the Handwriting Parser that these should be treated as valid Key entries. Looking back at the process 200 in FIG. 2B, it can be seen that the first three steps are still valid: 201, 202, 203. The document must still be written 201, scanned 202 and run through the OCR engine 203. However, in this case, the Handwriting Parser may identify these Key Regions and for those Key Regions skip Alternate Key Table 44 and Valid Key Table 405 and proceed directly to Key Lookup 406. The rest of the block diagram would apply as before. The Handwriting Parser may identify a page and use the pre-registered Key Regions, e.g., using a software setting, to set the page type, computer vision pattern match of a page type, or perhaps by reading a code 2002 somewhere on the page. An example of a code 2002 is shown in FIG. 20.

It should be understood that a number of keys that have not been provided in the above examples are included in illustrative embodiments of the invention. Such keys may include a purchase key (e.g., $BUY) linked to an online shopping account (e.g., Amazon). Accordingly, a user may initiate a purchase of an item through Amazon using the process 200 described above. Furthermore, to ensure order accuracy, a reorder key (e.g., $RO) may be linked to an online shopping account (e.g., Amazon), and may look through a linked account's order history to reorder an item. For example, '$RO cereal' may identify a previously ordered cereal and reorder that same cereal. Additionally, some keys may allow for a quantity input as well (e.g., $RO cereal 2 boxes). It should be apparent that these functions may linked with multiple accounts, such as ordering movie tickets, plane tickets, purchasing items (e.g., Amazon, grocery store online sites, such as Whole Foods, etc.), automatically create online reviews through linked review accounts (e.g., Yelp, etc.), and/or placing reservations (e.g., OpenTable). Accordingly, illustrative embodiments enable automation of many of the tasks in a traditional to-do list.

It is envisioned that online actions can include virtually any action that can be taken by a user. The following are but a few examples of some types of keys and actions that can be specified:

$DO—a to-do item $BUY—make an online purchase $TXT—send a specified message to a specified person/contact via text message.

$EM—send a specified message to a specified person/contact via email message.

$VA—create a calendar entry or entries for the user's vacation on specified dates.

$BD—create a calendar entry for a specified person's birthday.

$HO—create a calendar entry for a specified holiday.

$APPT—create a calendar entry for an appointment or meeting on a specified date/time.

$XFER—transfer a specified amount of funds to a specified person $ADDR—save or enter an address into a map or wayfinding application $RX—refill a prescription $PAY—pay an online bill $FOOD—add a specified item to an online food shopping list $REM—generate a reminder, e.g., to take a medication at a specified time $FLT—check into a flight It should be noted that the parser can be configured to implement complex contextual functions, e.g., automatically creating an annually recurring calendar entry for a birthday or holiday, automatically creating one or more calendar entries covering vacation days and designating such calendar entry or entries as "out of office," automatically designating a calendar entry as "busy" for an appointment, automatically configuring an email system to generate an "out of office" message during vacations, etc. Thus, for example, a single textual instruction can cause an interaction with multiple applications or systems. Also, the parser can be configured to store functions and execute them in the future. For example, the user could instruct the parser to pay an online bill on a certain day or check into a flight at a certain time (e.g., 24 hours prior to the flight).

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

It should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the various Handwriting Parser and OCR Engine embodiments described herein) are necessarily non-conventional because, absent special programming or configuration, the conventional components do not inherently perform the described non-conventional methods.

The activities described and claimed herein provide technological solutions to problems that arise squarely in the realm of technology. These solutions as a whole are not well-understood, routine, or conventional and in any case provide practical applications that transform and improve computers and computer systems.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A handwriting parser configured to perform computer processes comprising:
   receiving a digital representation of handwritten text on paper, the handwritten text including: (1) a key associated with a predetermined action, and (2) other handwritten content;
   identifying, in the digital representation of the handwritten text, the key associated with the predetermined action;
   using the identified key to obtain metadata specifying how to determine relevant content, from the digital representation of the handwritten text, relating to the identified key;

processing the digital representation using the metadata to identify relevant content in the digital representation of the handwritten text that is related to the identified key; and providing an instruction to execute the predetermined action using the relevant content.

2. The handwriting parser of claim 1, wherein identifying the key comprises:
identifying the key based on a position of the key in the digital representation.

3. The handwriting parser of claim 1, wherein the database is a lookup table, and identifying the key comprises:
identifying a key candidate in the digital representation;
accessing an alternate key table including a plurality of key candidates; and
accessing a valid key table to identify the key from among the plurality of key candidates.

4. The handwriting parser of claim 3, wherein the alternate key table comprises, for each of the plurality of key candidates, a predetermined confidence metric.

5. The handwriting parser of claim 4, wherein accessing the valid key table to identify the key from among the plurality of key candidates comprises:
selecting a key candidate from among the plurality of key candidates based on the predetermined confidence metrics; and
comparing the selected key candidate to valid keys in the valid key table.

6. The handwriting parser of claim 3, further comprising:
generating the alternate key table from an alternate character map specifying, for each of a number of possible characters, at least one possible alternate character and a corresponding confidence metric.

7. The handwriting parser of claim 1, wherein the metadata specifies spacing information for locating the relevant content, and wherein processing the digital representation using the metadata comprises processing the digital representation using the spacing information.

8. The handwriting parser of claim 1, wherein obtaining the digital representation comprises:
processing an image of the handwritten text using an optical character recognition engine configured to convert the handwritten text into a digital representation.

9. The handwriting parser of claim 1, wherein obtaining the digital representation comprises:
capturing the image using a camera of a mobile device.

10. The handwriting parser of claim 9, wherein obtaining the digital representation comprises:
receiving the handwriting on a touch screen.

11. The handwriting parser of claim 1, wherein the predetermined action is creating a to-do list.

12. The handwriting parser of claim 1, wherein the predetermined action triggers a purchase on an online marketplace.

13. The handwriting parser of claim 1, wherein the predetermined action provides a document title for the digital representation of the handwritten text, and the relevant content is a title name.

14. The handwriting parser of claim 1, wherein the paper is synthetic paper or cellulosic paper.

15. A handwriting parsing system for parsing a text input for an action key and performing an action associated with the key, the system comprising:

an input configured to receive a digital representation of a handwritten text;
an OCR engine configured to perform optical character recognition on the digital representation of the handwritten text to produce an OCR text;
a key identification module configured to identify at least one action key candidate in the OCR text, the action key candidate having one or more typographical characters;
an alternative character map configured to identify typographical character alternatives for the typographical characters;
an alternate key table configured to contain variations of alternative key candidates using the typographical character alternatives, the key identification module configured to generate a confidence metric relating to the likelihood that the alternative key candidates are accurate representations of a corresponding key in the handwritten text;
a valid key table configured to contain one or more valid action keys, the key identification module selecting an action key on the basis of the alternative key candidate with the highest confidence metric that matches a valid action key;
a metadata lookup table configured to lookup the metadata relating to the selected action key;
a data filter configured to filter the OCR text to determine valid data fields relating to the selected action key; and
a key action engine configured to interact with an online service to perform an action specified by the key and the valid data field.

16. A computer program product comprising a tangible, non-transitory computer readable medium having embodied therein a computer program that, when run on at least one computer processor, implements a handwriting parser that performs computer processes using a digital representation of a handwritten text written on paper, the computer processes comprising:
identifying, in a digital representation of a handwritten text, a key associated with a predetermined action;
using the identified key to obtain metadata specifying how to determine relevant content, in the digital representation of the handwritten text, that relates to the identified key, wherein the relevant content is different from the key;
processing the digital representation to identify relevant content in the digital representation of the handwritten text that is associated with the identified key based on the obtained metadata; and
providing an instruction to execute the predetermined action using the relevant content.

17. The computer program product of claim 16, wherein the database comprises a lookup table.

18. The computer program product of claim 16, wherein the metadata includes spacing information.

19. The computer program product of claim 16, wherein the predetermined action provides a document title for the digital representation of the handwritten text, and the relevant content is a title name.

20. The computer program product of claim 16, wherein the digital representation of the handwriting is obtained using a camera.

* * * * *